United States Patent [19]

Karamian

[11] 4,235,677

[45] Nov. 25, 1980

[54] DISTILLATION FLASK AND APPARATUS FOR PRODUCING HIGH-PURITY WATER HAVING OVERFLOW LIQUID TRAP MEANS

[75] Inventor: Narbik A. Karamian, Bethesda, Md.

[73] Assignee: The United States of America as represented by the Secretary of Health, Education and Welfare, Washington, D.C.

[21] Appl. No.: 880,425

[22] Filed: Feb. 23, 1978

Related U.S. Application Data

[63] Continuation-in-part of Ser. No. 671,713, Mar. 29, 1976, Pat. No. 4,089,749.

[51] Int. Cl.$^3$ .............................................. C02B 1/04
[52] U.S. Cl. ................................. 202/176; 202/200; 202/202; 55/522; 137/251; 137/395; 137/577; 203/10; 203/86; 203/DIG. 2; 203/DIG. 25; 222/188
[58] Field of Search ............... 202/181, 176, 200, 201, 202/202, 186, 203, 185 E, 189, 187, 190, 191, 267; 203/1, DIG. 25, 10, 11, 49, 86, 87, DIG. 17, DIG. 2, 41, 39, 40; 55/97, 527, 528, 522; 137/593, 389, 391, 395, 396, 251, 577; 222/188

[56] References Cited

U.S. PATENT DOCUMENTS

| | | | |
|---|---|---|---|
| 3,340,157 | 9/1967 | Weiss | 202/180 |
| 3,403,980 | 10/1968 | Litterio | 202/181 |
| 3,696,003 | 10/1972 | Fitch et al. | 202/181 |
| 3,849,260 | 11/1974 | Ruckstuhl | 202/181 |
| 3,907,683 | 10/1973 | Gilmont | 202/180 |
| 4,089,749 | 5/1978 | Karamian | 203/86 |
| 4,113,571 | 9/1978 | Nygards | 202/181 |

*Primary Examiner*—Wilbur L. Bascomb, Jr.
*Attorney, Agent, or Firm*—Browdy and Neimark

[57] ABSTRACT

An apparatus for the continuous production of high-purity water includes a distillation flask, a carboy and a condenser unit, all of borosilicate glass. A respective filter, preferably in the form of a polytetrafluoroethylene sheet, is provided between the ambient atmosphere and the interiors of the flask, the carboy and the condenser unit to remove airborne bacteria and dust particles. An inlet valve is provided for feeding water to be purified into the flask, all water-contacting parts of this valve being of polytetrafluoroethylene. The open parts are interconnected with flexible, polytetrafluoroethylene tubing. A two-way, stopcock allows high-purity water to be removed from the carboy. The flask is provided with a glass overflow trap. In one variant, the water is fed into the flask via members between the trap and the flask. In a preferred variant, the water is fed into the flask via a separate inlet and allowed to flow out through the overflow trap, thereby allowing precipitate to be constantly washed out of the flask.

21 Claims, 5 Drawing Figures

DISTILLATION FLASK AND APPARATUS FOR PRODUCING HIGH-PURITY WATER HAVING OVERFLOW LIQUID TRAP MEANS

This application is a continuation-in-part of application Ser. No. 671,713, of Narbik A. KARAMIAN filed on Mar. 29, 1976 and now U.S. Pat. No. 4,089,749 and entitled "APPARATUS FOR PRODUCING HIGH-PURITY WATER", its disclosure being incorporated herein in its entirety by reference.

FIELD OF THE INVENTION

This invention relates to an apparatus for continuously producing high-purity water and, in particular, to an apparatus for continuous production of high-purity, bacteria-free, endotoxin-free water. The water produced by the apparatus is suitable for biomedical use. The invention also relates to a flask which advantageously can be used as a part of the apparatus.

BACKGROUND OF THE INVENTION

There has been a constant demand for high-purity water for research and intravenous admixtures. However, it has not yet proved possible to produce water free of everything. Since the water quality requirements vary from one project to another, the tolerable level and the nature of contaminants in the water of course also vary. Therefore, compromises are made with respect to the quality, and the economic requirements in order to obtain water for specific needs. The most common contaminants found in high-purity water are metallic ions, gases, organic compounds, bacteria and their by-products, endotoxins, and mycotoxins.

Ideally, distillation should give water of the highest purity, since the process of purification is merely one of adding heat to convert the water to steam and then condensing the steam to recover the water in pure form. In practice this is not the case because of the difficulties involved in producing water free of all substances.

Many are now convinced that high purity water is not only ideal to have for some research, but is absolutely essential for many biomedical experiments, especially those requiring the injection of parenteral solutions. For this reason, many laboratory distillation devices have been introduced.

Among the known apparatus for producing purified water are those which use multiple distillation techniques as disclosed, for example, in Taylor, "An Apparatus for the Continuous Production of Triple Distilled Water," *Journal of Chemical Education*, Vol. 37, No. 4, pages 204–205, April 1960. This known apparatus is complex and requires a plurality of distillation flasks and burners.

A system, which includes an overflow regulator and a pressure-controlled shutoff valve, for preparing distilled and deionized water has been proposed in Reasor et al., "Distilled-Deionized Water: A System for Preparing and Distributing Large Volumes," *Science*, Vol. 161, pages 227–279, July 1968. While relatively large volumes of water can be produced in this known apparatus with little surveillance, secondary storage reservoirs are required.

It has been proposed, in an effort to reduce contamination, to provide systems which both produce and store water free of contact with air. The still and storage reservoir in these known systems are combined so that the distillate is always covered with steam which serves to exclude air. Such a system is disclosed, for example, in Hichman et al., "A Distilling System for Purer Water," *Science*, Vol. 180, No. 4081, pages 15–24, April 1973. While such systems exclude contaminates which may be carried by ambient air to a considerable extent, contaminates from other sources are not excluded. Other drawbacks also result. The water is maintained at a high temperature, limiting its immediate use. The system is believed to be expensive to operate.

A technique, using chemical action, of purifying water to reduce the level of organic impurities, which cannot be removed by ordinary or oxidative distillation, using pyrocatalytic distillation apparatus has been disclosed in Conway et al., "Ultrapurification of Water for Electrochemical and Surface Chemical Work by Catalytic Pyrodistillation," *Analytical Chemistry*, Vol. 45, No. 8, pages 1331–1336, July 1973. A considerable amount of energy is required and the probability of inorganic contamination is believed to be high when pyrocatalytic distillation techniques are used.

None of the prior art techniques mentioned above are completely satisfactory for producing high-quality water. Systems in which metals contact water generally produce water containing higher levels of metallic ions than are found in water purified in Pyrex of quartz. It is also generally accepted that waters produced in all-glass distillation apparatus may contain ions leached out from the glass. These include ions of the following elements: Na, K, B, Ca, Pb, As, and Si which are present at parts-per-billion levels. These ions may also be leaching out of laboratory glassware into the water being used in projects. Therefore, this kind of contamination from the still should be of no concern when ordinary glassware is to be used.

A primary source of contamination produced by an all-glass still is the feed water. Metallic and organic contaminants found in distillates usually arise from improper fractionation of the water during the process of distillation. The contaminanted water enters the condenser by entrainment and/or creepage of the liquid along the glass surfaces.

In pharmaceutical work it is important that the water used for the preparation of parenteral solutions be free from endotoxins. The water used for this purpose is normally made by distillation. During distillation, the endotoxins in the feed water carry over by entrainment and contaminante the distillate. In order to prevent endotoxins and other impurities from entering the distilled water, the still must be designed to prevent creepage and entrainment. The water in a storage vessel must also be kept sterile and protected from chemical contamination. The distillation apparatus described here was constructed to produce and store water of the highest possible purity, while requiring minimal operating and maintenance time.

It has also been found that in apparatus for the production of high-purity water which is to operate for long periods, the input water ordinarily should be firstly treated to remove materials which would otherwise cause precipitates, such as carbonates, to collect on the internal surface of the flask.

SUMMARY OF THE INVENTION

It is the principal object of the present invention to provide an apparatus for the production of high-purity water which avoids the aforementioned drawbacks of the prior art.

It is another object of the present invention to provide an apparatus for the production of high-purity, bacteria-free, endotoxin-free water which does not depend on multiple or pyrocatalytic distillation techniques.

It is a further object of the present invention to provide an apparatus for the production of high-purity, bacteria-free, endotoxin-free water which effects the production and storage of the high-purity water free of any need for establishing or maintaining a steam cover for the water.

It is an additional object of the present invention to provide an apparatus for the continuous production and storage of high-purity water which is both inexpensive to make and to operate and can be readily constructed.

It is yet another object of the present invention to provide an apparatus for the continuous production and storage of high-purity water, as well as a flask therefor, which includes an overflow arrangement for the flask.

It is yet a further object of the present invention to provide an apparatus for the continuous production and storage of high-purity water, as well as a flask therefor, which includes an overflow arrangement for the flask which allows precipitates to be washed from the flask during operation.

The foregoing objects, as well as others which are to become apparent from the text below, are achieved in accordance with the present invention in its apparatus aspect by providing an apparatus for the production of high-purity water, which apparatus includes a distillation flask, a condenser unit and a carboy, a respective filter being provided to allow air to pass between the ambient atmosphere and the interiors of the flask, the condenser unit and the carboy.

The carboy, flask and condenser unit are desirably made of borosilicate glass. All open parts or sections are preferably connected together by high-pressure, flexible polytetrafluoroethylene tubing. All parts of valves and stopcocks, which may be used, coming in contact either with the water to be purified or the already purified water in the carboy are of polytetrafluoroethylene.

The foregoing objects, as well as still others which are to become apparent from the text below, are achieved by the present invention, in its flask aspect, by providing a flask with a fluid holding portion and a fluid trap. The trap includes a first hollow member and a second hollow member interconnected by a first tubular member which opens into the second hollow member, an overflow drain being attached to the second tubular member above that point at which the first tubular member opens thereto. A second tubular member is connected between the fluid holding portion and the first hollow member, the second tubular member being connected to the first hollow member below that point at which the first tubular member is connected thereto.

DETAILED DESCRIPTION OF THE PREFERRED EMBODIMENTS

Figure 1:
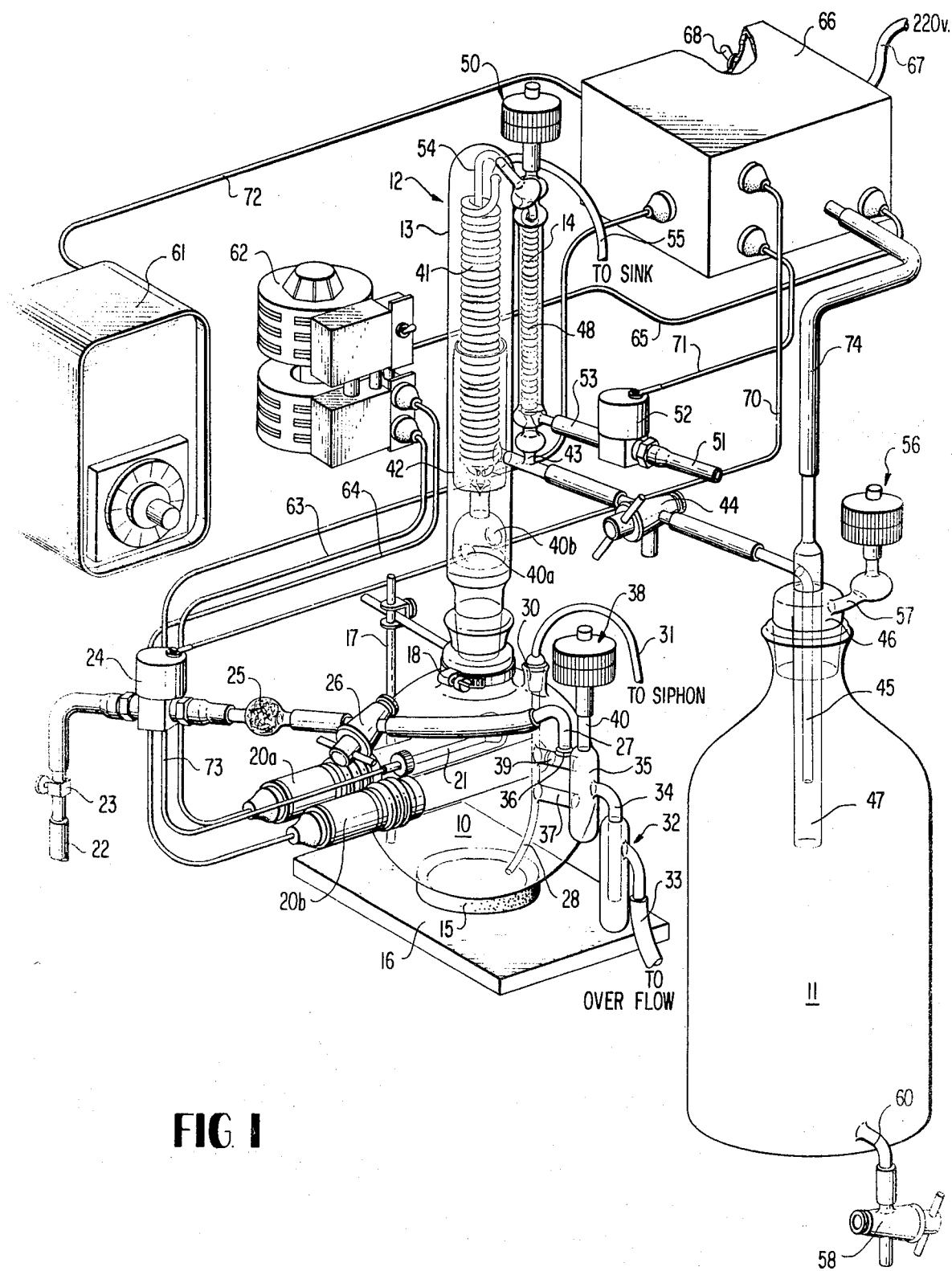
FIG. 1 is a pictorial, partly schematic diagram of an apparatus for producing high-purity, bacteria-free, endotoxin-free water according to a first illustrative embodiment of the present invention.
Figure 3:
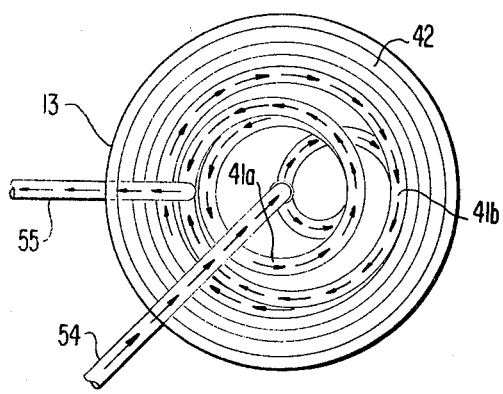
FIG. 3 is a top plan view of the larger condenser of FIG. 2.
Figure 2:
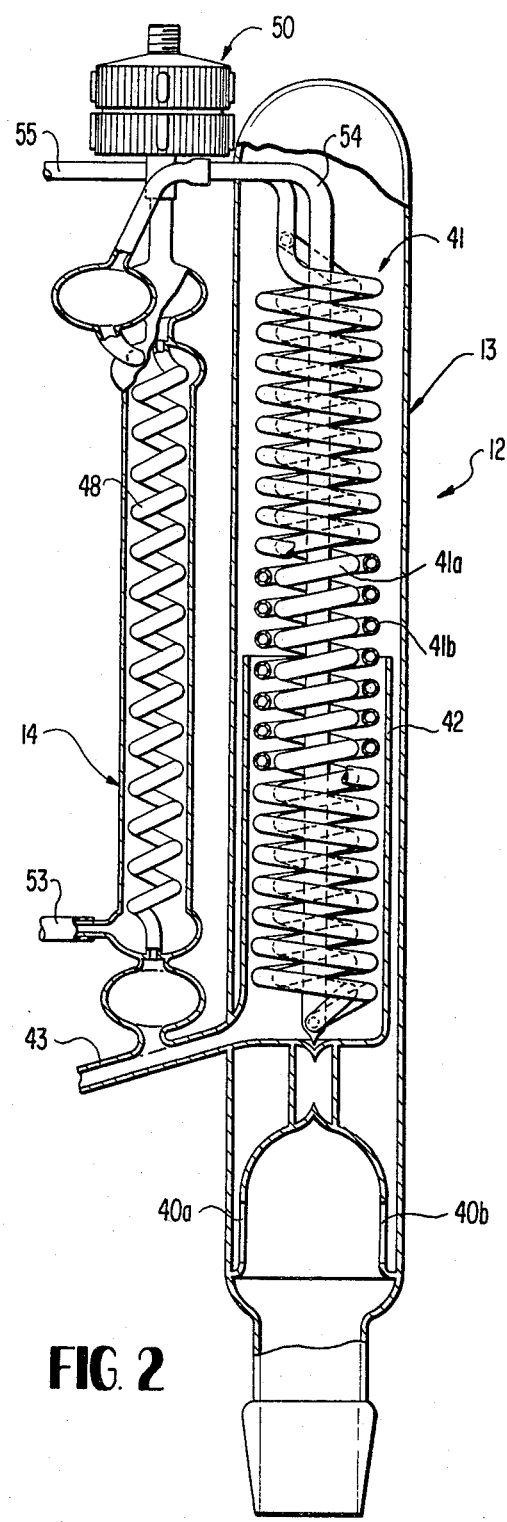
FIG. 2 is a side elevational view of condenser unit of FIG. 1 parts being broken away for sake of clarity.

Referring to FIGS. 1-3, a first embodiment of an apparatus for the production of high-purity, bacteria-free, endotoxin-free water for biomedical use and the like includes a distillation flask 10, a carboy 11 and a condenser unit, all made of borosilicate glass. The condenser unit 12 is composed of a large condenser 13 and a 200 mm long Graham condenser 14, the latter condenser which is conventional being available from any number of major laboratory glassware supply companies. The condenser 13, which is the larger of the two, is available from the Bellco Glass Inc. of 340 Udall, Road, Vineland, N.J. 08360. As will be described in more detail below, the cooling water paths within the condenser 13 and the condenser 14 are connected in series. The Graham condenser 14 and the large condenser 13 have their condensed water outlets connected together, the distillate from both condensers being arranged to be fed to the carboy 11.

The distillation flask 10 is positioned on a cork ring 15 which rests on a mounting fixture 16. As adjustable bracket 17 extends upwardly from the mounting fixture 16, a clamp 18 being fixed to the bracket 17 and extending about the neck of the distillation flask 10. Two resistance heating elements 20a and 20b coated heavily with quartz to prevent metal and water contact are positioned within the flask 10 for the purpose of heating water in the flask 10 so as to provide steam for feeding the condenser unit 12. A heat-responsive sensing electrical transducer 21 is positioned within the flask 10 above the heating elements 20a and 20b to sense the water level within the flask. The transducer 21 produces an electrical signal whenever the temperature above the heating elements 20a and 20b exceeds a predetermined level, indicating that the water level within the flask 10 is too low.

Deionized water or house distilled water is fed into the flask 10 via a feed-water line 22, a needle valve 23, made of polytetrafluoroethylene, a two-way solenoid valve 24 having its parts which come in contact with water either coated by or made of polytetrafluoroethylene, a coarse-grade, scintered glass filter 25 which will remove suspended solids before distillation and a T-shaped, three-way polytetrafluoroethylene plugged stop-cock 26 having a four millimeter bore and side arms with a diameter approximately ten millimeters. The outlet of the stop-cock 26 is connected to the interior of the flask 10, via an integral inlet tubular member 27.

An eight millimeter outer diameter borosilicate glass tube 28 may be provided within the flask 10 from its lowermost interior upwardly and out through an opening 30 to a line 31 which is to be connected to a siphon. The tube 28 is for the purpose of removing water left over from the previous distillation. The operation is performed by applying a vacuum to the line 31 until all water is removed from the flask 10. The tube 28 can remain in place.

A glass water trap composed of two hollow members 32 and 35 are interconnected by a tube 34, the lower hollow member 32 having an overflow drain line 33. The hollow member 35 is connected to the interior of the flask 10 via a tubular member 37. A more upwardly positioned tubular member 36 being in direct fluid communication with the inlet tube 27, but closed by a glass wall 39 from the interior of the flask 10. Any excess water flowing into the flask 10, via the member 37, which tends to establish a water level above the inlet to the tube 34 is drained off via the hollow member 35 and the tube 34 into the hollow member 32, and thence to the drain line 33. Air is prevented from entering the flask 10 via the drain line 33 by water maintained within the hollow members 32 and 35, these water levels being necessarily above the outlet of the tube 34. It is to be appreciated that the drain line 33 may be clamped shut, if desired, when the apparatus is not in operation.

The hollow member 32 has an external diameter of 25 millimeters and an internal diameter of 21 millimeters. The length of the hollow member 32 is 12.8 centimeters. The tube 34 extends downwardly into the hollow member 32 10.8 centimeters leaving two centimeters of space from its open end to the bottom of the hollow member 32. The drain line 33 is approximately 10 millimeters in outer diameter and connected to the hollow member 32 near its top. It is to be understood that the hollow member 32 cannot be too long nor the tube 34 too short if siphoning is to be avoided and the equilibrium of the distillation apparatus maintained during operation. The lengths set out above for these parts are suitable in a practical embodiment.

Figure 4:
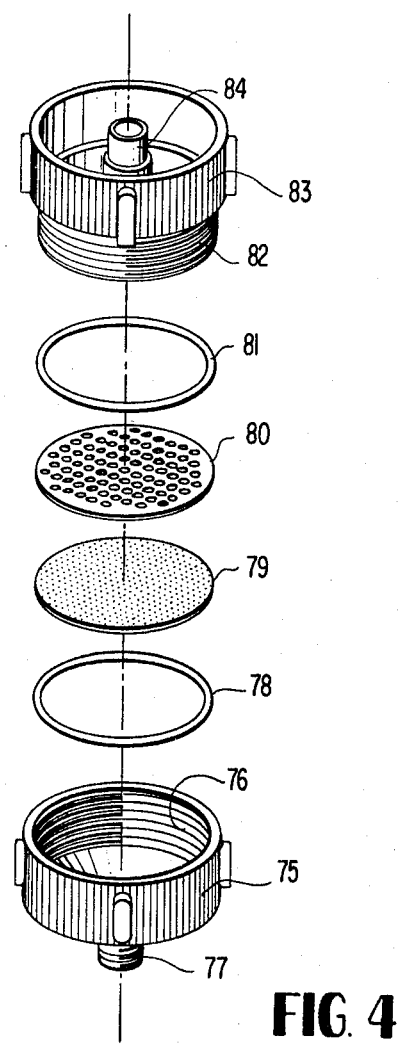
FIG. 4 is an exploded pictorial view of a filter holder with its internal parts which can be used for the filters in the apparatus of FIG. 1.

A first filter 38, which may be constructed as illustrated in FIG. 4, includes a holder provided with a 47 mm porous, polytetrafluoroethylene membrane (not visible), such membrane filters being available from the Milipore Corporation of Bedford, Mass. 01730. The filter 38 allows air to pass into the flask 10, via a tubular member 40 which communicates with the interior of the filter 38, the hollow member 35 and the tubular members 36 and 37. The membrane filter forming part of the filter 38 effects the cleaning of air entering or leaving the flask 10, airborne bacteria and dust particles being effectively removed. The porous polytetrafluoroethylene membrane is perferred as the filtering element of the filter 38 because it is nonadsorbent and hydrophobic.

The end of the large condenser 13 is positioned within the neck of the distillation flask 10 so that steam produced in the distillation flask 10 can enter the condenser 13 via a pair of apertures 40a and 40b which provides fluid communication with the interior of the condenser 13. Steam entering the condenser 13 collects as condensation on cooling coils 41, which are constituted by two parallel connected helical coils 41a and 41b, as best seen in FIGS. 2 and 3, through which cooling water flows, the condensation collecting in a collector 42 which surrounds the lower portion of the cooling coils 41. The interior of the collector 42 is connected to the carboy 11 via a tubular extension 43, a T-shaped, three-way polytetrafluoroethylene-plugged stop-cock 44 which is constructed identically as the stop-cock 26, and a tubular member 45 which has an outer diameter of 8 millimeters and extends into the carboy 11 via an aperture in a stopper 46 positioned in the neck of the carboy 11. The tube 45 extends into and runs coaxially with a tube 47 which has an inner diameter of 21 millimeters and an outer diameter of 2.5 millimeters and also extends out of the carboy 11 through the stopper 46. The tube 47 is 35.5 centimeters in length from its open end to a neck defining the beginning of a capillary tube which connects to a tube 74. The tube 47 extends downwardly into the carboy 11 with its open end approximately 20 centimeters from the bottom of a tapered joint 71/60 defining the neck of the carboy 11. It is to be understood that the length of the tube 47 must be sufficient to assure that the pressure built up in the tube 74 is sufficient to assure that a pressure-operated switch within the water watcher 66, which deenergizes the apparatus, functions whenever the level of the water within the carboy 11 reaches its neck and not before. The suggested length for the tube 47 mentioned above has been found to be suitable in a practical embodiment.

The condenser 14 is provided with a helical tubular member 48, having a lower end in direct flow communication with the interior of the tubular member 43 which receives the condensed water collected in the collector 42. The other end of the tubular member 48 is connected and opens directly into the interior of a filter 50 which may be constructed identically to the filter 38. The membrane forming part of the filter 50 effects the cleaning of air entering or leaving the tubular member 43 and consequently air entering or leaving the condenser unit 12. The filter 50 effect the removal of airborne bacteria and dust particles which may otherwise contaminate the condenser unit 12. The Graham condenser 14 serves to keep the membrane of the filter 50 substantially unaffected by moisture in the form of water vapor, the water vapor being effectively collected on the interior surface of the coils 48 within the condenser 14 and return to the tubular member 43 and thence to the carboy 11. The filter 50 may be constructed as shown in more detail in FIG. 4.

Cooling water for the condenser unit 12 is supplied via a tubular member 51 to the interior of the cylindrical jacket of the Graham condenser 14, via a brass two-way solenoid valve and a tube 53. The cooling water within the jacket of the Graham condenser 14 passes upwardly within the jacket and exits via a tube 54 which extends downwardly along the axis of the jacket of the large condenser 13 and into the collector 42. Near the bottom of the collector 42, the tubular member 54 is divided into two parts which are arranged into the form of the two tubular helical coils 41a and 41b coaxial with one another, these two coaxially arranged tubular coils extending upwardly within the jacket of the condenser 13 and constituting the helical coils 41. The two helically arranged tubular extensions of the tube 54 are joined together and jointly communicate with an extension 55 which is arranged to feed the used cooling water to sink or the like, as best seen in FIG. 3.

A third filter 56 is connected via a tube 57 to the interior of the carboy 11 via an aperture in the stopper 46. The filter 56 is preferably constructed indentically to the filters 50 and 38; a polytetrafluorethylene membrane is used as the filtering element. In the event only short periods of use are contemplated, the filter 56 can be constructed to use a fiberglass filtering element in place of the polytetrafluoroethylene membrane to reduce initial cost. The filter 56 allows air to pass into and out of the carboy 11, while removing airborne bacteria and dust particles thereby preventing contamination of the high-purity water stored in the carboy 11. The carboy 11 is provided with a two-way polytetrafluoroethylene plugged stop-cock 58 having a 4 mm bore, this stop-cock 58 being coupled to a tubular extension 60 from the carboy 11.

Assembly of the distillation and storage sections of the apparatus for producing high-purity water as thus far described is completed by interconnecting all open parts or sections with tubing (unnumbered) which preferably is high-pressure, three-eighths inch in internal diameter, flexible polytetrafluoroethylene tubing which has been available under Catalogue No. 3/8 CFTH from the W. L. Gore and Associates, Inc. of Elkton, Md. A suitable polytetrafluoroethylene tubing is now available from Penntube Plastics Company, Inc., Madison Avenue and Holley Street. Clifton Heights, Pa. 19018.

The apparatus for producing high-purity water according to the present invention includes additionally an electronically operated variable timer 61 which can delay the energization of the heating elements 20a and 20b for sufficient time, for example thirty minutes, to allow the distillation flask 10 to fill with water supplied via the solenoid valve 24. A 220 volt variable autotransformer unit 62 is provided for supplying electricity to the resistance heating units 20a and 20b via respective three-conductor power cords 63 and 64. The autotransformer unit 62 is supplied with input power via a three-conductor cord 65 from the electronically controlled water watcher 66 of the type available from the aforementioned Bellco Glass, Co., Inc. Input power to the water watcher 66 is provided by a power cord 67, a switch 68 being provided for turning the water watcher 66 on. When the switch 68 is turned on, the solenoid valve 24 and the solenoid valve 52 are both energized via respective three-conductor power cords 70 and 71 to effect initiation of deionized or house distilled water to the distillation flask 10 and cooling water to the condenser unit 12. The water watch unit 66 also supplies power to the timer 61 via a three-conductor power cord 72, the timer 61 effecting the delay of application of voltage to a return conductor in the power cord 72 for a given period of time upon the expiration of which voltage is applied to the return conductor back to the water watcher 66 which then energizes the power cord 65 resulting in an output voltage from the autotransformer unit 62, which voltage is supplied to the power cords 63 and 64 to effect application of current to the resistance heating units 20a and 20b, this application of current it is to be appreciated does not take place until sufficient water is within the distillation flask 10 to cover the heating units 20a and 20b. The water watcher 66 includes internally a solenoid operated switch which is controlled, via a cord 73 which carries signals from the heat sensing transducer 21. The water watcher 66 includes internally the pressure-operated switch which is operationally coupled to the tube 47 within the carboy 11, via the flexible polypropylene tube 74 of eight millimeters inside diameter. In operation, whenever the water level within the carboy 11 extends above the bottom of the tube 47, air within the tube 47 starts to be compressed, at some point causing the pressure-operated switch within the water watcher 66 to disconnect all power from the solenoid valves 24 and 52 as well as the power input to the autotransformer unit 62. Thus, when the carboy 11 becomes nearly full of high-purity water, the operation of the apparatus is interrupted. As soon as the water within the carboy 11 falls sufficiently lower, the pressure-responsive switch within the water watcher unit 66 effects the energization of the autotransformer unit 62 and the two solenoid valves 24 and 52 placing the apparatus again in operation. If for one reason or another the water level within the distillation flask 10 falls below the resistance heaters 20a and 20b, the heat-responsive transducer 21 produces a signal which is coupled to the water watcher 66 via the cord 73 causing a protective relay within the water watcher 66 to deenergize all of the outputs from the water watcher 66 including input to the variable timer 61. The apparatus is intended to remain inoperative in this instance until reset by an operator.

Turning now to FIG. 4, the details of a filter suitable for use as the filter 38, the filter 50 and the filter 56 is shown in an exploded view. The filter includes a plastic upper housing 75 of cylindrical construction which has its outer surface partially knurled, its open end being provided internally with threads 76 and its upper end being provided with an opening defined by a bore within a protrusion 77. A first rubber O-ring is provided within the housing 75 adjacent a flat surface defined by a groove within the housing 75 in which the O-ring fits. A porous polytetrafluoroethylene membrane 79 or a fiberglass sheet 79, as the case may be, is positioned adjacent the first O-ring 78 within the upper housing 75, a plastic perforated disc filter element 80 being placed over the membrane or sheet 79 as a support therefor, the element 80 being positioned so as to flush with the top of the housing 83. A second rubber O-ring 81 is positioned over the last thread of threads 82 on the lower housing member 83. The assembly as thus far described being when in operation assembled with the upper housing 75 screwably engaged with the threads 82 formed on the upper portion of a plastic lower housing member 83. The housing member 83 has a knurled outer surface and is opened at the bottom, a tubular member 84 extending centrally downward within the cylindrical lower housing member 83 so as to provide a means for gas communication with members associated with the carboy 11, the distillation flask 10 and the condenser unit 12 as the case may be so as to provide that air from these parts of the apparatus may flow inwardly and outwardly through the filters 38, 50 and 56 to the atmosphere, while avoiding contamination of the interior of the apparatus by bacteria and dust particles.

A suitable polytetrafluoroethylene-filter membrane for use as member 79 can be obtained from the Millipore Corp, of Bedfore, Massachusetts under Catalogue No. FALP04700. A fiberglass sheet for use as member 79 is available from the Americal Air Filter Co., Inc. of Louisville, Kentucky under Catalogue No. FG50.

Before starting the distillation process, the water remaining in the flask 10 from the previous distillation is removed, as indicated above, by applying suction to the tube 31. In order to start the apparatus in operation, the switch 68 on the water watcher 66 is turned on, causing the solenoid valves 24 and 52 to open. Cooling water flows through the condenser unit 12 and deionized or rough-polished water fills the distillation flask 10 from the line 22. The resistance heaters 20a and 20b remain inoperative for a give time, for example thirty minutes because of the operation of the timer 61. Upon expiration of the predetermined delay, a time sufficient for the flask 10 to fill, the timer 61 supplies a return voltage to the water watcher 66 via a conductor within the power cord 72, this voltage operates a relay within the water watcher 66 which causes an input voltage to be supplied to the autotransformer unit 62 via the power cord 65, the autotransformer unit 62 supplying current to the resistance heating units 20a and 20b via the respective power cord 63 and 64. Any overflow water entering the flask 10 is effectively drained from the flask 10 via the overflow line 33. The water within the flask 10 boils, the resulting steam being supplied to the condenser unit 12 and collected as condensate about the helically wound tubing 41, the condensate running down the tubing and into the collector 42 and thence to the carboy 11, via the stop-cock 44. Whatever water vapor tends to escape upwardly into the condenser 14, is condensed on the helically wound tubing 48 and returns to the tubular member 43 and thence to the carboy 11. At the beginning of the distillation, volatile substances as $N_2$, $CO_2$, CO, $NH_3$, $Cl_2$, $CH_2O$, as well as other volatile substances may or may not be present in the first portion of the distillate. If these substances are objectionable, they can be discarded via the stop-cock 44. After the distillation has proceeded for a few minutes, the stop-cock 44 can be then turned to allow water to enter the carboy 11. When the carboy 11 is filled with water, the air pressure builds up within the tube 47, which forces the pressure-responsive switch located within the water watcher 66 to open thereby cutting off power from the water watcher 62 to the resistance heaters 20a and 20b as well as power to the two solenoid operated valves 24 and 52, and the autotransformer unit 62. The apparatus remains in this particular state until the water level within the carboy 11 is lowered sufficiently to reduce pressure within the tube 47 so that the pressure-response switch within the water watcher 66 is placed in its other position again energizing the afore-mentioned power cords again placing the apparatus in operation. If during operation, the water level within the flask 10 falls below the resistance heating elements 20a and 20b and remains there for sufficient time to have these elements raise the atmosphere temperature within the distillation flask 10 sufficiently to cause the transducer 21 to produce an electrical signal indicative of a too low water level, the water watcher unit 66 is automatically shut off by deenergization of the holding relay which supplies power from the main input line cord 67 to the water watcher 66. The water watcher 66 remains deenergized until an operator resets the apparatus.

The distillation apparatus must be assembled so that it is free of bacterial contamination. Various cleaning procedures were tested, and it was concluded that the best results are obtained when each of the components of the distillation unit, which contacts water, is first washed with an aqueous detergent solution and then rinsed or soaked in dilute nitric acid (1:1) solution. The units are assembled without rinsing the residual acid from the glass surfaces.

The flask 10 is washed repeatedly with water until all of the acid is removed. Then the distillation is begun by activating the switch 68. Distillates are collected in the carboy 11. When the carboy 11 is filled, it is drained through the stop-cock 58. This process is repeated until the pH of the water reaches 5.5 to 5.8.

Prior to assembly, the air filters 38, 50 and 56 and other parts that do not come into direct contact with water must be washed with aqueous detergent solution, and sterilized with an agent such as ethylene oxide gas, formaldehyde vapors or alcohols or phenols, whichever is most convenient to use.

It is crucial that the polytetrafluoroethylene plugged stop-cock 58 of carboy 11 be kept free of contamination. This is the main avenue by which bacteria enter the system after acid-washing of the carboy. In order to aviod contaminating the carboy 11, one needs to observe the following precautions: (1) avoid touching the tip of stop-cock 58 by hand or with laboratory implements, (2) drain some water from the carboy 11 several times a day when the water is not being used, (3) flame or pour alcohol occasionally over the exterior of the stop-cock 58. These steps will prevent bacteria from growing on and entering the stop-cock 58.

Once a distillation unit of the aforementioned description is assembled, it will serve for the production of high-quality water with minimal surveillance. One needs merely to turn on switch 68 to start the distillation and fill carboy 11 with water.

The water produced by the apparatus for production of high-purity water according to the present invention, as illustrated in FIG. 1, has been tested repeatedly. The water was found to be suitable for both chemical and biological research work. No inorganic elements other than those leached from the borosilicate glass were detected. The water produced is ideal for tissue culture growth, one of the most sensitive and critical of biomedical research operations.

Three independent investigations have been conducted on water from the carboy 11 for endotoxins. A first investigation tested water from the carboy 11 by both the Rabbit and the Limulus Amebocyte Lysate Methods. A second investigation of water from the carboy 11 tested the water by only the Limulus Amebocyte Lysate Method. A third investigation tested water from the carboy 11 by the Limulus Amebocyte Lysate Method, using a standard kit supplied by the Mallinckrodt Chemical Company of St. Louis, Mo. In all of these studies, it was reported that water produced and stored by the apparatus illustrated in FIG. 1 contained no detectable endotoxins.

To examine water from the carboy 11 for bacterial contamination, two series of tests were performed. First, the apparatus was assembled without special attention being given to the handling of the components except that they were acidwashed and the air filters 38, 50 and 56 were not placed at the positions shown in FIG. 1. The water collected by this technique in the carboy 11 was tested by qualified bacteriologists, using a first standard procedure from a work entitled "Standard Methods for the Examination of Water and Wastewater" *Standard Plate Count*, 13th Ed., pages 660–662 published by the Public Health Association, Washington, D.C. (1971) and with a kit designated "Sterifil Aseptic Filter System" supplied by the Millipore Corporation under Catalogue No. XX1104700. The presence of *Alcaligenes faecalis* bacteria with counts in the millions (TNTC) per 200 ml sample were reported in both tests. *Alcaligenes faecalis* are gram-negative, strictly aerobic and slow-growing bacteria which are present in water, feces and humid air surrounding sinks and drainage systems.

The second experiment was performed by firsly recleaning and sterilizing the apparatus of FIG. 1 and by installing the air filter 38, 50 and 56, and again testing the water using the procedures described above. The bacteriological test results indicated that no *Alcaligenes faecalis* bacteria were present in the distilled water after storing the water in the carboy 11 for 14 days, see Table I below for details. The samples were incubated for 48, 72, 120 and 240 hours at room temperature. The apparatus was then turned on daily and the water was used under normal laboratory operating conditions. Samples were taken continually for bacteriological examination and, as the results set out in Table II below indicate, no bacteria were found after 75 days of operation. Further tests were performed indicating no bacteria was present even after 8 months of operation.

TABLE I

BACTERIOLOGICAL GROWTH DATA FOR DISTILLED WATER PRODUCED WITH FILTERS IN PLACE AND STORED IN CARBOY 11 FOR 14 DAYS

| Accumulated Time Days | Volume Examined cc | Incubation Time At Room Temperature (Hours) | | | |
|---|---|---|---|---|---|
| | | 48 | 72 | 120 | 240 |
| 1 | 1 | 0 | 0 | 0 | 0 |
| | 200 | 0 | 0 | 0 | 0 |
| 2 | 1 | 0 | 0 | 0 | 0 |
| | 200 | 0 | 0 | 0 | 0 |
| 3 | 1 | 0 | 0 | 0 | 0 |
| | 200 | 0 | 0 | 0 | 0 |
| 6 | 1 | 0 | 0 | 0 | 0 |
| | 200 | 0 | 0 | 0 | 0 |
| 7 | 1 | 0 | 0 | 0 | 0 |
| | 200 | 0 | 0 | 0 | 0 |
| 9 | 1 | 0 | 0 | 0 | 0 |
| | 200 | 0 | 0 | 0 | 0 |
| 14 | 1 | 0 | 0 | 0 | 0 |
| | 200 | 0 | 0 | 0 | 0 |
| Control | 200 | 0 | 638 | 638 | 638 |

0: No Growth.
Control: Ordinary laboratory distilled water sampled before entering in the distillation apparatus.

TABLE II

BACTERIOLOGICAL GROWTH DATA FOR DISTILLED WATER PRODUCED WITH FILTERS IN PLACE, STORED IN CARBOY 11 AND USED UNDER NORMAL LABORATORY CONDITIONS

| Accumulated Time Days | Volume Examined cc | Incubation Time At Room Temperature (Hours) | | | |
|---|---|---|---|---|---|
| | | 48 | 72 | 120 | 240 |
| 14 | 1 | 0 | 0 | 0 | 0 |
| | 200 | 0 | 0 | 0 | 0 |
| 17 | 1 | 0 | 0 | 0 | 0 |
| | 200 | 0 | 0 | 0 | 0 |
| 21 | 1 | 0 | 0 | 0 | 0 |
| | 200 | 0 | 0 | 0 | 0 |
| 24 | 1 | 0 | 0 | 0 | 0 |
| | 200 | 0 | 0 | 0 | 0 |
| 27 | 1 | 0 | 0 | 0 | 0 |
| | 200 | 0 | 0 | 0 | 0 |
| 31 | 200 | 0 | 0 | 0 | 0 |
| 34 | 200 | 0 | 0 | 0 | 0 |
| 37 | 200 | 0 | 0 | 0 | 0 |
| 41 | 200 | 0 | 0 | 0 | 0 |
| 75 | 200 | 0 | 0 | 0 | 0 |
| Control | 200 | 0 | 725 | 725 | 725 |

0: No growth.
Control: Ordinary laboratory distilled water sampled before entering in the distillation apparatus.

It should be recognized that the distilled water being stored in the carboy 11 of the apparatus may not remain free of contaminants indefinitely. Only one *Alcaligenes faecalis* or one *Pseudomonous aerugenosa* bacterium is required in the carboy 11 to start the growth of either organism in non-nutrient distilled water. Nevertheless, it has been demonstrated that with a distilled water apparatus of the kind described above as an illustration of the present invention, high-quality water can be produced as long as care is taken not to contaminate the stop-cock 58 which serves as the water outlet from the carboy 11. The apparatus can produce bacteria-free, endotoxin-free and chemically-free, high-purity water continuously.

If, by any chance, the system, usually the water carboy 11, becomes contaminated with bacteria or even with chemicals, cleaning is a simple matter. One liter of 50% nitric acid can be poured into the carboy 11 and 100 cc are added to distillation flask 10 and the cleaning cycle described above is followed. It is not necessary to disassemble the components of the apparatus for cleaning and sterilizing purposes.

It has been demonstrated in this work that highpurity, bacteria-free and endotoxin-free water can be produced, stored, and dispensed by means of an apparatus operating in the environment of a working laboratory. The latter qualification is of great significance, because it means that such water, which is essential for many pharmaceutical and biomedical research applications, need not require a clean room for its production or dispensing or for use in solution compounding as long as careful techniques for handling sterile systems are followed.

It is to be appreciated that the use of tubing made of polytetrafluoroethylene and the provision that parts of the stop-cocks and the valve which contacts the water to be purified, as well as the purified water, are desirable features. Polytetrafluoroethylene is to a high degree nonhygroscopic, hydrophobic and nonabsorbant. As a result, seepage and creepage of water, which otherwise would tend to contaminate the water, is reduced to a considerable extent.

Figure 5:
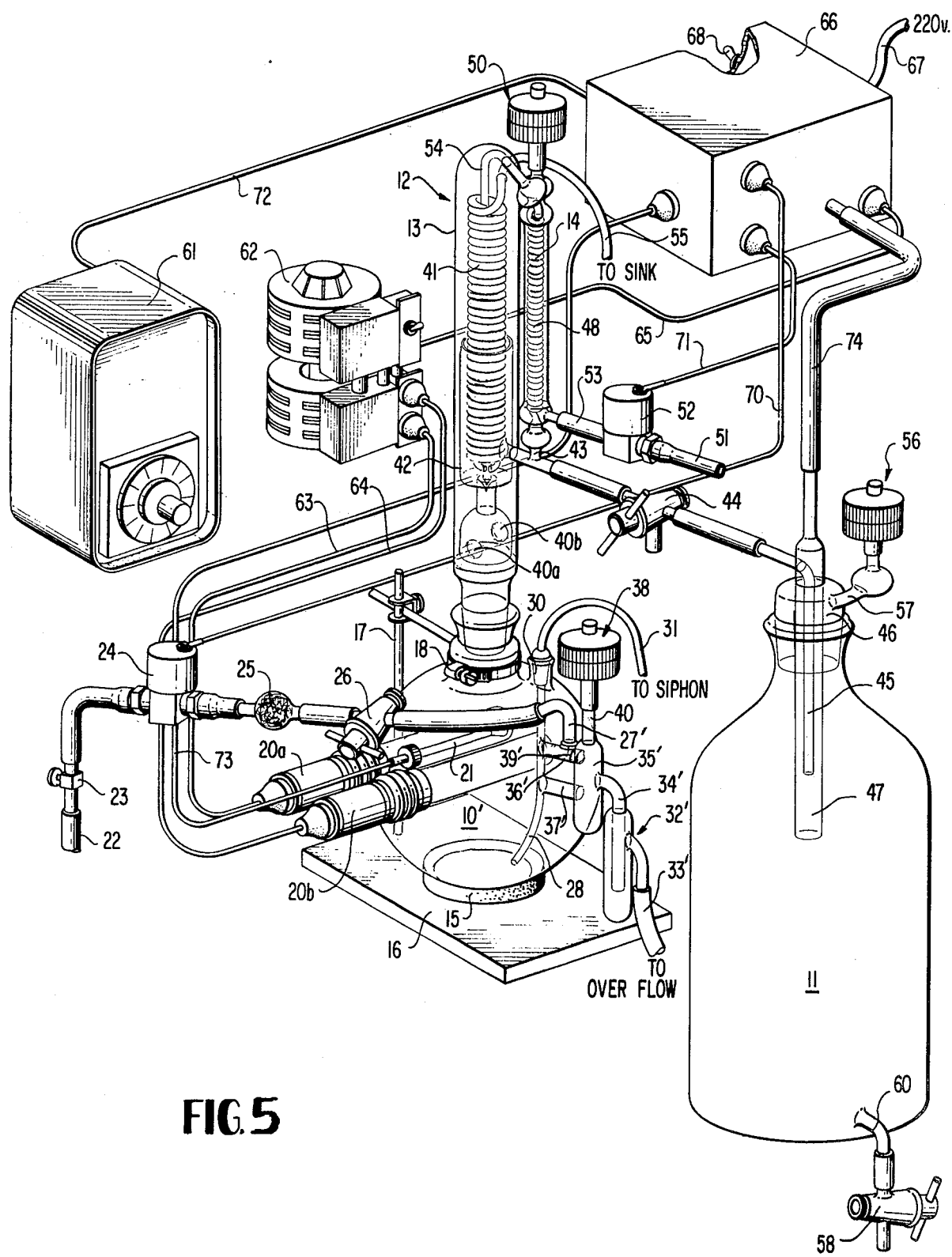
FIG. 5 is a pictorial, partly schematic diagram of an apparatus for producing high-purity, bacteria-free, endotoxin-free water according to the second illustrative embodiment of the present invention.

With reference to FIG. 5, considered in conjunction with FIGS. 2 and 3, a second embodiment of an apparatus for the production of high-purity, bacteria-free, endotoxin-free water for biomedical use and the like is to be described below, like reference numerals designating like parts to those used in describing the first embodiment, while prime signs are associated with corresponding parts the apparatus which differs. The apparatus includes flask 10', a carboy 11 and a condenser unit, all made of borosilicate glass. The condenser unit 12 is composed of a large condenser 13 and a 200 mm long Graham condenser 14, the latter condenser which is conventional being available from any number of major laboratory glassware supply companies. The condenser 13, which is the larger of the two, is available from the Bellco Glass Inc. of 340 Udall Road, Vineland, N.J. 08360. As will be described in more detail below, the cooling water paths within the condenser 13 and the condenser 14 are connected in series. The Graham condenser 14 and the large condenser 13 have their condensed water outlets connected together, the distillate from both condensers being arranged to be fed to the carboy 11.

The distillation flask 10' is positioned on a cork ring 15 which rests on a mounting fixture 16. An adjustable bracket 17 extends upwardly from the mounting fixture 16, a clamp 18 being fixed to the bracket 17 and extending about the neck of the distillation flask 10'. Two resistance heating elements 20a and 20b coated heavily with quartz to prevent metal and water contact are positioned within the flask 100 for the purpose of heating water in the flask 10' so as to provide steam for feeding the condenser unit 12. A heatresponsive sensing electrical transducer 21 is positioned within the flask 10' about the heating elements 20a and 20b to sense the water level within the flask. The transducer 21 produces an electrical signal whenever the temperature above the heating elements 20a and 20b exceeds a predetermined level, indicating that the water level within the flask 10' is too low.

Preferably deionized water or house distilled water is fed into the flask via a feed-water line 22, a needle valve 23, made of polytetrafluoroethylene, a two-way solenoid valve 24 having its parts which come in contact with water either coated by or made of polytetrafluoroethylene, a coarse-grade, scintered glass filter 25 which will remove suspended solids before distillation and a T-shaped, three-way polytetrafluoroethylene plugged stop-cock 26 having a four millimeter bore and side arms with a diameter approximately ten millimeters. While deionized water or house distilled water is preferably used, it is to be understood that the embodiment is not limited to use with only such waters and in fact can operate using ordinary tap water because of the use of the specific fluid trap and overflow arrangement which is to be described in more detail below. The outlet of the stop-cock 26 is connected to the interior of the flask 10', via an integral inlet tubular member 27.

An eight millimeter outer diameter borosilicate glass tube 28 may be provided within the flask 10' from its lowermost interior upwardly and out through an opening 30 to a line 31 which is to be connected to a siphon. The tube 28 is for the purpose of removing water left over from the previous distillation. The operation is performed by applying a vacuum to the line 31 until all water is removed from the flask 10'. The tube 28 can remain in place. It is to be understood that the tube 28 and its associated parts are not necessary.

A glass water trap composed of two hollow members 32' and 35' are interconnected by a tube 34', the lower hollow member 32' having an overflow drain line 33'. The hollow member 35' is connected to the interior of the flask 10' via a tubular member 37'. A more upwardly positioned tubular member 36' being in direct fluid communication with the inlet tube 27', but closed by a glass wall 39' from the interior of the hollow member 35' and in fluid communication with the interior of the flask 10'. Any water flowing into the flask 10', via the member 36' which is in excess of that which is collected as the distillate in the carboy 11, tends to establish a water level above the inlet to the tube 34' and flows into the hollow member 35' via the tubular member 37' and is drained off from the hollow member 35' and the tube 34' into the hollow member 32', and thence to the drain line 33'. Thus, the water which leaves the interior of the flask 10' in practicale effect removes precipitates which otherwise would tend to collect on the bottom of the flask 10' and on its interior surface. Consequently, even when raw tap water is fed into the flask 10', the apparatus can operate for long periods. It is believed that the apparatus could operate for about one year using raw tap water, in distinction to a period of about two weeks were the first described embodiment used, which does not have the wash feature. Air is prevented from entering the flask 10' via the drain line 33' by water maintained within the hollow members 32' and 35', these water levels being necessarily above the outlet of the tube 34'. It is to be appreciated that the drain line 33' may be clamped shut, if desired, when the apparatus is not in operation.

The hollow member 32' has an external diameter of 25 millimeters and an internal diameter of 21 millimeters. The length of the hollow member 32' is 12.8 centimeters. The tube 34' extends downwardly into the hollow member 32' 10.8 centimeters leaving two centimeters of space from its open end to the bottom of the hollow member 32'. The drain line 33' is approximately 10 millimeters in outer diameter and connected to the hollow member 32' near its top. It is to be understood that the hollow member 32' cannot be too long nor the tube 34' too short if siphoning is to be avoided and the equilibrium of the distillation apparatus maintained during operation. The lengths set out above for these parts are suitable in a practical embodiment.

A first filter 38, may be constructed as illustrated in FIG. 4, which has been discussed above in detail. The filter which includes the polytetrafluoroethylene membrane 38 allows air to pass into the flask 10', via a tubular member 40 which communicates with the interior of the filter 38, the hollow member 35' and the tubular members 36' and 37'. The membrane filter forming part of the filter 38 effects the cleaning of air entering or leaving the flask 10', airborne bacteria and dust particles being effectively removed. The porous polytetrafluoroethylene membrane is preferred as the filtering element of the filter 38 because it is nonadsorbent and hydrophobic.

The end of the large condenser 13 is positioned within the neck of the distillation flask 10' so that steam produced in the distillation flask 10' can enter the condenser 13 via a pair of apertures 40a and 40b which provides fluid communication with the interior of the condenser 13. Steam entering the condenser 13 collects as condensation on cooling coils 41, which are constituted by two parallel connected helical coils 41a and 41b, as best seen in FIGS. 2 and 3, through which cooling water flows, the condensation collecting in a collector 42 which surrounds the lower portion of the cooling coils 41. The interior of the collector 42 is connected to the carboy 11 via a tubular extension 43, a T-shaped, three-way polytetrafluoroethylene-plugged stop-cock 44 which is constructed identically as the stop-cock 26, and a tubular member 45 which has an outer diameter of 8 millimeters and extends into the carboy 11 via an aperture in a stopper 46 positioned in the neck of the carboy 11. The tube 45 extends into and runs coaxially with a tube 47 which has an inner diameter of 21 millimeters and an outer diameter of 2.5 millimeters and also extends out of the carboy 11 through the stopper 46. The tube 47 is 35.5 centimeters in length from its open end to a neck defining the beginning of a capillary tube which connects to a tube 74. The tube 47 extends downwardly into the carboy 11 with its open end approximately 20 centimeters from the bottom of a tapered joint 71/60 defining the neck of the carboy 11. It is to be understood that the length of the tube 47 in the tube 74 is sufficient to assure that a pressure-operated switch within the water watcher 66, which deenergizes the apparatus, functions whenever the level of the water within the carboy 11 reaches its neck and not before. The suggested length for the tube 47 mentioned above has been found to be suitable in a practical embodiment.

The condenser 14 is provided with a helical tubular member 48, having a lower end in direct flow communication with the interior of the tubular member 43 which received the condensed water collected in the collector 42. The other end of the tubular member 48 is connected and opens directly into the interior of a filter 50 which may be constructed identically to the filter 38. The membrane forming part of the filter 50 effects the cleaning of air entering or leaving the tubular member 43 and consequently air entering or leaving the condenser unit 12. The filter 50 effect the removal of airbore bacteria and dust particles which may otherwise contaminate the condenser unit 12. The Graham condenser 14 serves to keep the membrane of the filter 50 substantially unaffected by moisture in the form of water vapor, the water vapor being effectively collected on the interior surface of the coils 48 within the condenser 14 and return to the tubular member 43 and thence to the carboy 11. The filter 50 may be constructed as shown in more detail in FIG. 4.

Cooling water for the condenser unit 12 is supplied via a tubular member 51 to the interior of the cylindrical jacket of the Graham condenser 14, via a brass two-way solenoid valve and a tube 53. The cooling water within the jacket of the Graham condenser 14 passes upwardly within the jacket and exits via a tube 54 which extends downwardly along the axis of the jacket of the large condenser 13 and into the collector 42. Near the bottom of the collector 42, the tubular member 54 is divided into two parts which are arranged into the form of the two tubular helical coils 41a and 41b coaxial with one another, these two coaxially arranged tubular coils extending upwardly within the jacket of the condenser 13 and constituting the helical coils 41. The two helically arranged tubular extensions of the tube 54 are jointed together and jointly communicate with an extension 55 which is arranged to feed the used cooling water to a sink or the like, as best seen in FIG. 3.

A third filter 56 is connected via a tube 57 to the interior of the carboy 11 via an aperture in the stopper 46. The filter 56 is preferably constucted identically to the filters 50 and 38, a polytetrafluoroethylene membrane being used as the filtering element. As in the first embodiment, the filter 56 can use a filtering element made of fiberglass, provided only short periods of operation are contemplated. The filter 56 allows air to pass into and out of the carboy 11, while removing airbore bacteria and dust particles thereby preventing contamination of the high-purity water stored in the carboy 11. The carboy 11 is provided with a two-way polytetrafluoroethylene plugged stop-cock 58 having a 4 mm bore, this stop-cock 58 being coupled to a tubular extension 60 from the carboy 11.

Assembly of the distillation and storage sections of the apparatus for producing high-purity water as thus far described is completed by interconnecting all open parts of sections with tubing (unnumbered) which preferably is high-pressure, three-eighths inch in internal diameter, flexible polytetrafluoroethylene tubing, as in the first embodiment.

The apparatus for producing high-purity water according to the present invention may include additionally an electronically operated variable timer 61 which can delay the energization of the heating elements 20a and 20b for sufficient time, for example thirty minutes, to allow the distillation flask 10' to fill with water supplied via the solenoid valve 24. A 220 volt variable autotransformer unit 62 is provided for supplying electricity to the resistance heating units 20a and 20b via respective three-conductor power cords 63 and 64. The autotransformer unit 62 is supplied with input power via a three-conductor cord 65 from the electronically controlled water watcher 66 of the type available form the afore-mentioned Bellco Glass, Co., Inc. Input power to the water watcher 66 is provided by a power cord 67, a switch 68 being provided for turning the water watcher 66 on. When the switch 68 is turned on, the solenoid valve 24 and the solenoid valve 52 are both energized via respective three-conductor power cords 70 and 71 to effect initiation of dionized or house distilled water to the distillation flask 10' and cooling water to the condenser unit 12. The water watch unit 66 also supplies power to the timer 61 via a three-conductor power cord 72, the timer 61 effecting the delay of application of voltage to a return conductor in the power cord 72 for a given period of time upon the expiration of which voltage is applied to the return conductor back to the water watcher 66 which then energizes the power cord 65 resulting in an output voltage from the autotransformer unit 62, which voltage is supplied to the power cords 63 and 64 to effect application of current to the resistance heating units 20a and 20b, this application of current it is to be appreciated does not take place until sufficient water is within the distillation flask 10 to cover the heating units 20a and 20b. The water watcher 66 includes internally a solenoid operated switch which is controlled, via a cord 73 which carries signals from the heat sensing transducer 21. The water watcher 66 includes internally the pressure-operated switch which is operationally coupled to the tube 47 within the carboy 11, via the flexible polypropylene tube 74 of eight millimeters inside diameter. In operation, whenever the water level within the carboy 11 extends above the bottom of the tube 47, air withing the tube 47 starts to be compressed, at some point causing the pressure-operated switch within the water watcher 66 to disconnect all power from the solenoid valves 24 and 52 as well as the power input to the autotransformer unit 62. Thus, when the carboy 11 becomes nearly full of high-purity water, the operation of the apparatus is interrupted. As soon as the water within the carboy 11 fails sufficiently lower, the pressure-responsive switch within the water watcher unit 66 effects the energization of the autotransformer unit 62 and the two solenoid valves 24 and 52 placing the apparatus again in operation. If for one reason or another the water level within the distillation flask 10' falls below the resistance heaters 20a and 20b, the heat-responsive transducer 21 produces a signal which is coupled to the water watcher 66 via the cord 73 causing a protective relay within the water watcher 66 to deenergize all of the outputs from the water watcher 66 including input to the variable timer 61. The apparatus is intended to remain inoperative in this instance until reset by an operator.

Before starting the distillation process, the water remaining in the flask 10' from a previous distillation, if any, is removed, as indicated above, by applying suction to the tube 31. In order to start the apparatus in operation, the switch 68 on the water watcher 66 is turned on, causing the solenoid valves 24 and 52 to open. Cooling water flows through the condenser unit 12 and deionized or rough-polished water or tap water as the case may be fills the distillation flask 10', flowing into the flask 10' from the line 22 via the tubular member 36'. The resistance heaters 20a and 20b remain inoperative for a given time, for example thirty minutes because of the operation of the timer 61. Upon expiration of the predetermined delay, a time sufficient for the flask 10' to fill, the timer 61 supplies a return voltage to the water watcher 66 via a conductor within the power cord 72, this voltage operates a relay within the water watcher 66 which causes an input voltage to be supplied to the autotransformer unit 62 via the power cord 65, the autotransformer unit 62 supplying current to the resistance heating units 20a and 20b via the respective power cords 63 and 64. Overflow water entering the flask 10' is effectively drained from the flask 10' via the tubular member 37', the hollow member 35', the tubular member 34', the hollow member 32' and the overflow line 33'. The water within the flask 10' boils, the resulting steam being supplied to the condenser unit 12 and collected as condensate running down the tubing and into the collector 42 and thence to the carboy 11, via the stop-cock 44. Whatever water vapor tends to escape upwardly into the condenser 14, is condensed on the helically wound tubing 48 and returns to the tubular member 43 and thence to the carboy 11. At the beginning of the distillation, volatile substances as $N_2$, $CO_2$, CO, $NH_3$, $Cl_2$, $CH_2O$, as well as other volatile substances may or may not be present in the first portion of the distillate. If these substances are objectionable, they can be discarded via the stop-cock 44. After the distillation has proceeded for a few minutes, the stop-cock 44 can be then turned to allow water to enter the carboy 11. When the carboy 11 is filled with water, the air pressure builds up within the tube 47, which forces the pressure-responsive switch located within the water watcher 66 to open thereby cutting off power from the water watcher 62 to the resistance heaters 20a and 20b as well as power to the two solenoid operated valves 24 and 52, and the autotransformer unit 62. The apparatus remains in this particular state until the water level within the carboy 11 is lowered sufficiently to reduce pressure within the tube 47 so that the pressure-response switch within the water watcher 66 is placed in its other position again energizing the afore-mentioned power cords again placing the apparatus in operation. If during operation, the water level within the flask 10' falls below the resistance heating elements 20a and 20b and remains there for sufficient time to have these elements raise the atmosphere within the distillation flask 10' sufficiently to cause the transducer 21 to produce an electrical signal indicative of a too low water level, the water watcher unit 66 is automaticall shut off by deenergization of the holding relay which supplies power from the main input line cord 67 to the water watcher 66. The water watcher 66 remains deenergized until an operator resets the apparatus.

In operation, it is to be appreciated that the rate at which water is fed to the flask 10' via the line 22 and the valve 24 must be in access of the rate at which water is supplied to the carboy 11 to assure that water from the flask 10' flows constantly out overflow line 33' during operation. This assures that most, if not substantially all, of the precipitates which would otherwise collect within the flask 10' is effectively removed therefrom as the distillation operation continues. While the amount of overflow from the flask 10' can be determined and set for given expected operating conditions, it would not be unusual to have the overflow amount exceed the distillate amount of a ratio of 2:1.

Although the tubular member 36' is shown as the fluid communication link into the interior of the flask 10', it also effects a portion of the support for the hollow member 35'. It is to be appreciated that the water fed to the flask 10' could be fed directly into the flask 10' by a separate tubular member, such as the tubular member 28 were it coupled to the valve 24 or a different tubular member. The water could be fed in tangentially to the interior wall of the flask 10', possibly near its bottom, to effect a swirling action as an air in removing precipatate from the interior wall and bottom of the flask 10'.

The illustrative embodiments of an apparatus for the production of high-purity water described above and shown in the accompanying drawing has been set out by way of example, not by way of limitation. It is to be appreciated that other embodiments and numerous variants are possible within the spirit and scope of the invention, its scope being defined in the appended claims.

What is claimed is:

1. An apparatus for the production of high-purity liquid, the apparatus comprising distillation flask means; a condenser unit; carboy means for receiving and storing the high-purity liquid; communication means for effecting fluid communication from said flask means to said condenser unit and thence to said carboy means, said flask means, said condenser unit, said carboy means and said communication means defining interior of the apparatus; and filter means coupled to said interior of the apparatus for filtering air entering said interior while allowing air to enter and to leave said interior of the apparatus, said flask means including an overflow liquid trap means for allowing liquid above a given level within said flask means to flow outward while preventing air from passing into said flask means via said trap means, and wherein said flask means includes a fluid holding member and wherein said liquid trap means comprises:

a fluid trap, said fluid trap including a first hollow member and a second hollow member interconnected by a first tubular member which opens into said second hollow member providing fluid communication from said first hollow member to said second hollow member, an overflow drain being coupled to said second hollow member above that height at which said first tubular member opens thereinto, and a second tubular member connected between said fluid holding member and said first hollow member, said second tubular member being connected to said first hollow member beneath that height at which said first tubular member is connected thereto.

2. An apparatus according to claim 1, wherein said filter means comprises at least one air filter in fluid communication with the interior of said carboy means.

3. An apparatus according to claim 2, wherein said filter means comprises a further air filter in fluid communication with the interior of said condenser unit.

4. An apparatus according to claim 3, wherein said filter means comprises an additional air filter in fluid communication with the interior of said flask means.

5. An apparatus according to claim 4, wherein said each of said air filters includes a respective filter member constituted by a porous polytetrafluoroethylene membrane.

6. An apparatus according to claim 4, wherein each of said air filters includes a respective filter member constituted by a sheet of material which is hydrophobic and nonabsorbent.

7. An apparatus according to claim 1, wherein said filter means includes porous polytetrafluoroethylene membrane means.

8. An apparatus according to claim 1, wherein said filter means includes at least one sheet made of material which is hydrophobic and nonabsorbent.

9. An apparatus according to claim 1, wherein said means for effecting fluid communication includes flexible tubular means of polytetrafluoroethylene.

10. An apparatus according to claim 1, wherein said carboy means includes polytetrafluoroethylene plugged stop-cock means.

11. An apparatus according to claim 1, further including conduit means operatively coupled to said flask means via valve means for feeding water to be purified into said flask means, said valve means having its internal surfaces which contact the water formed of polytetrafluorethylene.

12. An apparatus for the production of high-purity, bacteria-free and endotoxin-free water, the apparatus comprising distillation flask means; a condenser unit;

carboy means for receiving and storing high-purity water; fluid communication means for effecting direct, internal fluid communication from said flask means to said condenser unit and thence to said carboy means, said flask means, said condenser unit, said carboy means and said communication means defining interior of the apparatus and being serially connected; and hydrophobic, nonabsorbent filter means coupled to said interior of the apparatus for removing airborne bacteria and dust particles while allowing air to enter and to leave said interior of the apparatus, wherein said filter means includes at least one air filter in fluid communication with the interior of said carboy means at least one air filter in fluid communication with the interior of said condenser unit and at least one air filter in fluid communication with the interior of said flask means, wherein said flask means includes an overflow water trap means for allowing water above a given level within said flask means to flow outward while preventing air from passing into said flask means via said trap means, and wherein said flask means includes a fluid holding member and said water trap means comprises:

a fluid trap, said fluid trap including a first hollow member and a second hollow member interconnected by a first tubular member which opens into said second hollow member providing fluid communication from said first hollow member to said second hollow member, an overflow drain being coupled to said second member above that height at which said first tubular member opens thereinto, and a second tubular member connected to said first hollow member beneath that height at which said first tubular member is connected thereto.

13. An apparatus according to claim 12, wherein each of said air filters includes a respective filter member made of porous polytetrafluoroethylene.

14. An apparatus according to claim 13, wherein each of said filter members is constituted by a porous polytetrafluoroethylene membrane.

15. An apparatus according to claim 12, wherein each of said air filters includes a respective filter member made of material which is hydrophobic and nonabsorbent.

16. A fluid storage or distillation flask comprising a fluid holding member and fluid trap; said fluid trap including a first hollow member and a second hollow member interconnected by a first tubular member which opens into said second hollow member providing fluid communication from said first hollow member to said second hollow member, an overflow drain coupled to said second hollow member above that height at which said first tubular member opens thereinto, and a second tubular member connected between said fluid holding member and said first hollow member, said second tubular member being connected to said first hollow member beneath that height at which said first tubular member is connected thereto, whereby when fluid within said holding member is above the height of connection of said first tubular member to said first hollow member, fluid flows into said first hollow member via the second tubular member and thence into the second hollow member via the first hollow member and thence out the overflow drain.

17. A fluid storage or distillation flask according to claim 16, including an opening in said first hollow member for allowing fluid to enter said first hollow member and flow into said fluid holding member via said second tubular member.

18. A fluid storage or distillation flask according to claim 16, including an opening into said fluid holding member for allowing fluid to enter directly into said holding member.

19. A flask according to claim 16, including filter means coupled to said first hollow member for removing bacteria and dust particles while allowing air to enter and leave said first hollow member.

20. A flask according to claim 16, wherein said first hollow member and said second hollow member are respective elongated members fixed together by said first tubular member, said first tubular member extends downwardly within said second hollow member with its exit at a given height, and said overflow drain is in fluid communication with said second tubular member at a height above said given height.

21. A flask according to claim 16, including means for heating fluid therein and wherein said flask has an opening for allowing it to be coupled to a condenser unit.

* * * * *